(12) United States Patent
Mori

(10) Patent No.: US 10,695,871 B2
(45) Date of Patent: Jun. 30, 2020

(54) COMBINED MACHINING METHOD AND COMPUTER READABLE MEDIUM

(71) Applicant: FANUC CORPORATION, Yamanashi (JP)

(72) Inventor: Atsushi Mori, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 343 days.

(21) Appl. No.: 15/855,180

(22) Filed: Dec. 27, 2017

(65) Prior Publication Data

US 2018/0193945 A1 Jul. 12, 2018

(30) Foreign Application Priority Data

Jan. 10, 2017 (JP) ................... 2017-001925

(51) Int. Cl.

| B23K 26/53 | (2014.01) |
|---|---|
| B23K 26/24 | (2014.01) |
| B23K 26/00 | (2014.01) |
| B23K 26/402 | (2014.01) |
| B23K 26/60 | (2014.01) |
| B23K 26/10 | (2006.01) |
| B23K 26/40 | (2014.01) |
| B23K 101/40 | (2006.01) |

(52) U.S. Cl.
CPC .......... *B23K 26/53* (2015.10); *B23K 26/0093* (2013.01); *B23K 26/10* (2013.01); *B23K 26/24* (2013.01); *B23K 26/40* (2013.01); *B23K 26/402* (2013.01); *B23K 26/60* (2015.10); *B23K 2101/40* (2018.08)

(58) Field of Classification Search
CPC ...... B23K 26/53; B23K 26/60; B23K 26/402; B23K 26/0093; B23K 26/24; B23K 26/40; B23K 26/10; B23K 2101/40
See application file for complete search history.

(56) References Cited

U.S. PATENT DOCUMENTS

| 3,909,582 A | * | 9/1975 | Bowen | ............... | B23K 26/0846 |
| | | | | | 219/121.69 |
| 5,376,061 A | * | 12/1994 | Suzuki | ............... | B23K 26/0093 |
| | | | | | 483/13 |

(Continued)

FOREIGN PATENT DOCUMENTS

| JP | 60-133991 | 7/1985 |
|---|---|---|
| JP | 1-184218 | 7/1989 |

(Continued)

*Primary Examiner* — Patrick M. Buechner
(74) *Attorney, Agent, or Firm* — Wenderoth, Lind & Ponack, L.L.P.

(57) ABSTRACT

An absorptivity of a work is adjusted easily before laser machining is performed. A combined machining method performed by an apparatus including laser machining means and mechanical machining means includes a first step of performing mechanical machining with respect to a laser machining target region which is a target of laser machining on a machining target so that the laser machining target region has a surface shape having a predetermined absorptivity of a laser beam; and a second step of radiating a laser beam to the laser machining target region to heat the machining target after the first step ends.

12 Claims, 14 Drawing Sheets

(56) References Cited

U.S. PATENT DOCUMENTS

| | | | | |
|---|---|---|---|---|
| 5,756,378 | A * | 5/1998 | Arai | B23K 26/0738 257/700 |
| 6,043,453 | A * | 3/2000 | Arai | B23K 26/067 219/121.67 |
| 6,393,687 | B1 * | 5/2002 | Friedrich | B23K 26/0093 219/121.67 |
| 6,515,253 | B1 * | 2/2003 | Battaglia | B23K 26/0846 219/121.67 |
| 7,257,879 | B1 * | 8/2007 | Jancso | B23C 3/28 219/121.67 |
| 7,981,770 | B2 | 7/2011 | Kaneko | |
| 10,456,869 | B2 * | 10/2019 | Mori | B23K 26/032 |
| 2002/0035785 | A1 * | 3/2002 | Ho | H05K 3/0038 29/852 |
| 2006/0034036 | A1 * | 2/2006 | Miura | H01G 9/04 361/511 |
| 2009/0011571 | A1 | 1/2009 | Kaneko | |
| 2009/0011572 | A1 | 1/2009 | Kaneko | |
| 2009/0188101 | A1 * | 7/2009 | Durandet | B21J 15/025 29/525.01 |
| 2014/0083986 | A1 * | 3/2014 | Zhang | B23K 26/40 219/121.69 |
| 2016/0221118 | A1 * | 8/2016 | Yamashita | B23P 23/04 |
| 2019/0168340 | A1 * | 6/2019 | Henrottin | B23K 26/3584 |

FOREIGN PATENT DOCUMENTS

| | | |
|---|---|---|
| JP | 04-178285 | 6/1992 |
| JP | 04-344887 | 12/1992 |
| JP | 06-114443 | 4/1994 |
| JP | 6-246477 | 9/1994 |
| JP | 11-123583 | 5/1999 |
| JP | 2000-176664 | 6/2000 |
| JP | 2002-292486 | 10/2002 |
| JP | 2007-235068 | 9/2007 |
| JP | 2007-235069 | 9/2007 |
| JP | 2007-313515 | 12/2007 |
| JP | 2010-279965 | 12/2010 |

* cited by examiner

COMBINED MACHINING METHOD AND COMPUTER READABLE MEDIUM

This application is based on and claims the benefit of priority from Japanese Patent Application No. 2017-001925, filed on 10 Jan. 2017, the content of which is incorporated herein by reference.

BACKGROUND OF THE INVENTION

Field of the Invention

The present invention relates to a combined machining method and a computer readable medium for machining a machining target.

Related Art

Conventionally, mechanical machining which performs processing such as cutting, grinding, and polishing with respect to a machining target (hereinafter referred to as a work) is generally performed by a machine tool including tools, and the like. Moreover, laser machining which processes a work by radiating a laser beam to the work is also generally performed. For example, a technology of performing mechanical machining and laser machining with respect to one work is disclosed in Patent Documents 1 and 2.

Specifically, in the technology disclosed in Patent Documents 1 and 2, mechanical machining of grinding and polishing is performed with respect to a wafer which is a work so that the wafer has a thickness larger than a final machining thickness. After that, laser machining is performed with respect to the wafer using a laser dicing apparatus.

Furthermore, mechanical machining is performed again after the wafer is subjected to predetermined subsequent steps performed after the laser machining so that the wafer has a final machining thickness. In this manner, by performing mechanical machining in two stages, the wafer is prevented from being split during predetermined subsequent steps.

Patent Document 1:
Japanese Unexamined Patent Application, Publication No. 2007-235068

Patent Document 2:
Japanese Unexamined Patent Application, Publication No. 2007-235069

SUMMARY OF THE INVENTION

Laser machining can be roughly classified into three types including metamorphosis machining (for example, surface quenching) wherein the surface temperature of a machining target is increased to a temperature lower than a melting point of the machining target, melting machining (for example, welding or thermal cutting) wherein a surface temperature of a machining target is increased to a temperature higher than a melting point but lower than a boiling point, and machining wherein a work is evaporated and removed by heating the same at a temperature higher than a boiling point.

Here, in the case of evaporation machining, it is necessary to heat the work to a temperature higher than the boiling point. Therefore, it is necessary to adjust the power or the spot size of a laser beam so that energy density of the radiated laser beam on a work surface is increased as much as possible.

In contrast, in the case of metamorphosis machining and melting machining, it is necessary to heat the work surface to a low temperature. Due to this, it is necessary to adjust the power or the spot size of a laser beam so that energy density of the radiated laser beam on a work surface is maintained to be appropriately low.

In the heating process using a laser beam, a phenomenon occurs that when the work surface is heated to a certain high temperature, the absorptivity of a laser beam increases abruptly, and heating progresses. One of the reasons therefor is that the absorptivity of a laser beam tends to depend on the surface temperature of the work. The other reason is associated with a change in a surface state such as melting, oxidation, or carbonization and a change in a surface shape such as formation of a keyhole. However, when the energy density on the work surface of the radiated laser beam is low, a temperature rise on the work surface is slow, and therefore, a change in reflectivity of the laser beam on the surface is small. When the absorptivity of the laser beam on the work surface is low, the heat quantity absorbed by the work remains small and a problem that it is not possible to heat the work appropriately occurs.

In this respect, although heating can be performed more desirably as long as the absorptivity of a laser beam on the work surface can be increased, since the absorptivity of light on a material surface depends on a surface property or state or an incidence angle, it is difficult to change the absorptivity. Due to this, a general technology such as the technology disclosed in Patent Documents 1 and 2, for example, does not take the absorptivity of a work into particular consideration.

Moreover, conventionally, blackening processing has been performed by applying a dark absorbent, for example, to the surface of a work so that the absorptivity of a laser beam is increased. However, in this case, there is a problem that it is necessary to remove the absorbent after laser machining, which makes the steps complex and incurs an additional cost.

Therefore, an object of the present invention is to provide a combined machining method and a combined machining program capable of adjusting an absorptivity of a work easily before laser machining is performed.

(1) A combined machining method according to the present invention is a combined machining method performed by an apparatus (for example, a combined machining apparatus 100 to be described later) including laser machining means (for example, a laser machining unit 190 to be described later) and mechanical machining means (for example, a spindle motor 154 to be described later), the method including: a first step of performing mechanical machining with respect to a laser machining target region (for example, a laser machining target region 11 to be described later) which is a target of laser machining on a machining target (for example, a work 10 to be described later) so that the laser machining target region has a surface shape having a predetermined absorptivity of a laser beam; and a second step of radiating a laser beam (for example, a laser beam 20 to be described later) to the laser machining target region to heat the machining target after the first step ends.

(2) In the combined machining method according to (1), the method may further include a third step of performing mechanical machining with respect to the laser machining target region so that the machining target has a desired shape and/or a desired surface.

(3) In the combined machining method according to (1) or (2), the mechanical machining in the first step may involve forming the laser machining target region so as to have a surface shape in which the absorptivity of the laser beam is increased.

(4) In the combined machining method according to (3), the surface shape in which the absorptivity of the laser beam is increased may be a surface shape in which an incidence angle represented by a half-width angle of the laser beam with respect to the surface shape is equal to or larger than a convergence angle represented by a half-width angle of the laser beam.

(5) In the combined machining method according to (3) or (4), the surface shape in which the absorptivity of the laser beam is increased may be a surface shape in which an absorptivity of a P-wave component at an incidence angle of the laser beam with respect to the surface shape is equal to or larger than an absorptivity of a sum of a P-wave component and a S-wave component when the laser beam is incident perpendicularly.

(6) In the combined machining method according to any one of (3) to (5), the surface shape in which the absorptivity of the laser beam is increased may be a surface shape including a V-groove shape.

(7) In the combined machining method according to any one of (3) to (6), the surface shape in which the absorptivity of the laser beam is increased may be a surface shape including a repetition of the V-groove shape.

(8) In the combined machining method according to (7), each of the V-grooves of the surface shape including a repetition of the V-groove shape may have a flat portion in an apex and/or a trough of the V-groove.

(9) In the combined machining method according to any one of (3) to (8), the surface shape in which the absorptivity of the laser beam is increased may be a surface shape including a concave or convex cone or truncated cone.

(10) In the combined machining method according to (1) or (2), the mechanical machining in the first step may involve forming the laser machining target region so as to have a surface shape in which the absorptivity of the laser beam is decreased.

(11) In the combined machining method according to any one of claims (1) to (10), the mechanical machining in the first step may involve forming the laser machining target region so as to have a surface shape in which the absorptivity of the laser beam is uniform in the entire laser machining target region.

(12) A combined machining program according to the present invention is a combined machining program for causing an apparatus (for example, a combined machining apparatus 100 to be described later) including laser machining means (for example, a laser machining unit 190 to be described later) and mechanical machining means (for example, a spindle motor 154 to be described later) to function as an apparatus that performs a combined machining method including: a first step of performing mechanical machining with respect to a laser machining target region (for example, a laser machining target region 11 to be described later) which is a target of laser machining on a machining target (for example, a work 10 to be described later) so that the laser machining target region has a surface shape having a predetermined absorptivity of a laser beam; and a second step of radiating a laser beam (for example, a laser beam 20 to be described later) to the laser machining target region to heat the machining target after the first step ends.

According to the present invention, it is possible to adjust an absorptivity of a work easily before laser machining is performed.

DETAILED DESCRIPTION OF THE INVENTION

First, an overview of an embodiment of the present invention will be described. An embodiment of the present invention relates to combined machining of performing mechanical machining and laser machining both. In the present embodiment, before laser machining is performed, mechanical machining is performed with respect to a target region of laser machining on a work (hereinafter this region will be referred to as a "laser machining target region") so that the absorptivity of a laser beam is appropriate. After the mechanical machining is performed, laser machining is performed by radiating a laser beam to the laser machining target region.

In this way, it is possible to cause the work to absorb an appropriate quantity of heat and to heat the work to an intended temperature. That is, it is possible to attain the object of "providing a combined machining method and a combined machining program capable of adjusting an absorptivity of a work easily before laser machining is performed" mentioned in "SUMMARY OF THE INVENTION". Moreover, in the present embodiment, by performing mechanical machining again after laser machining is performed as necessary, it is also possible to form the work in a desired shape. Hereinabove, an overview of the embodiment of the present invention has been described.

Next, first to tenth embodiments will be described as embodiments of the present invention. Here, a configuration of a combined machining apparatus 100 for realizing the processes of these respective embodiments is common to the respective embodiments. Therefore, the configuration of the combined machining apparatus 100 will be described first, and the respective embodiments will be described in detail.

<Configuration of Combined Machining Apparatus 100 Common to Respective Embodiments>

Figure 1:
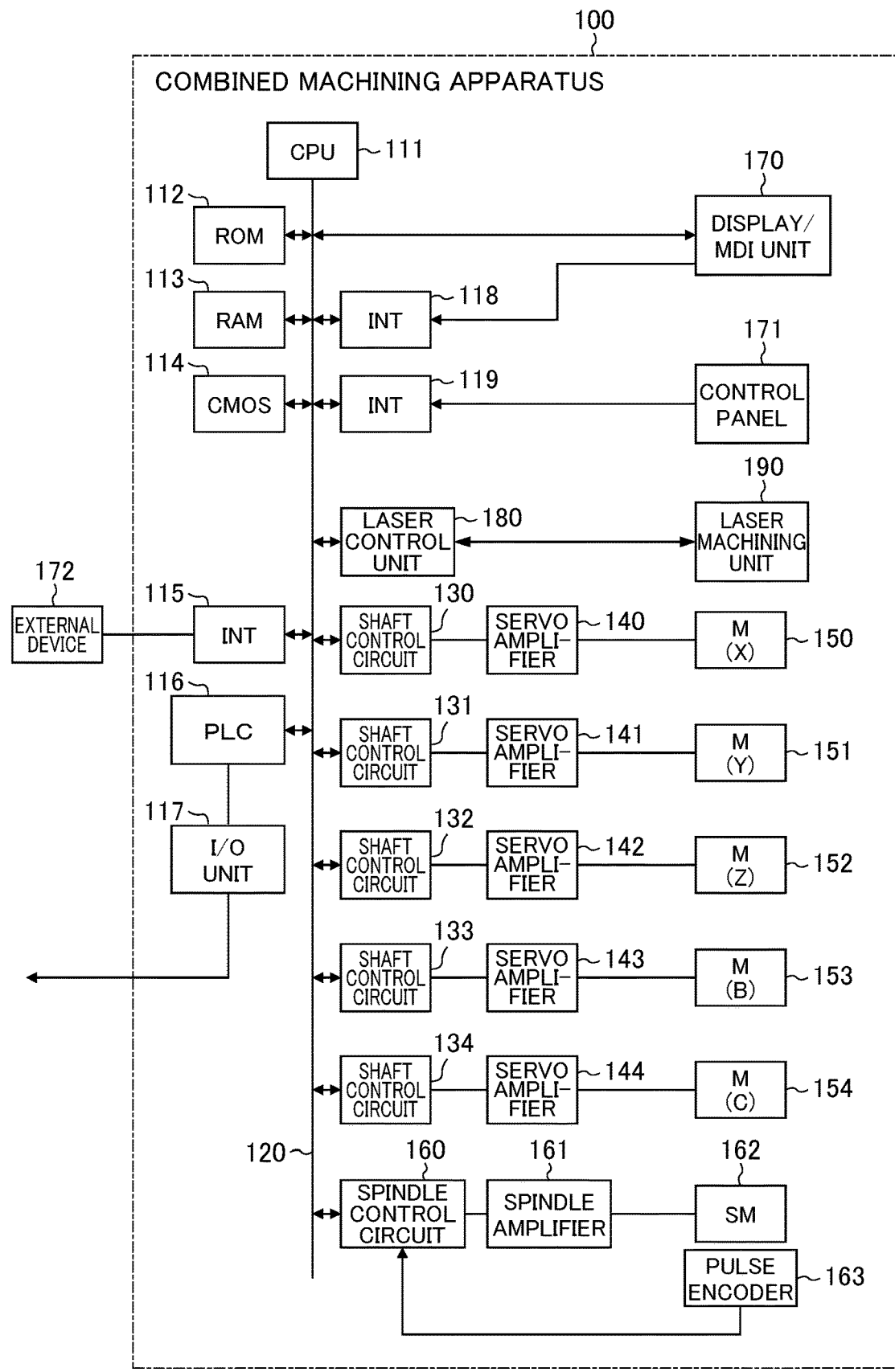
FIG. 1 is a diagram illustrating a basic configuration of a combined machining apparatus according to an embodiment of the present invention.

The configuration of the combined machining apparatus 100 will be described with reference to a functional block diagram of FIG. 1. Referring to FIG. 1, the combined machining apparatus 100 includes a CPU 111, a ROM 112, a RANI 113, a CMOS memory 114, a plurality of interfaces (I/Fs 115, 118, and 119), a PLC 116, an I/O unit 117, a data communication bus 120, a plurality of shaft control circuits (shaft control circuits 130 to 134), a plurality of servo amplifiers (servo amplifiers 140 to 144), a plurality of servo motors (servo motors 150 to 154), a spindle control circuit 160, a spindle amplifier 161, a spindle motor 162, a pulse encoder 163, a display/MDI unit 170, a control panel 171, an external device 172, a laser control unit 180, and a laser machining unit 190.

The CPU 111 is a processor that controls the entire combined machining apparatus 100. The CPU 111 reads a system program stored in the ROM 112 via the bus 120 and controls the entire combined machining apparatus 100 according to the system program. Transitory calculation data, display data, and various pieces of data input by an operator via the display/MDI unit 170 are stored in the RAM 113.

The CMOS memory 114 is configured as a nonvolatile memory which is backed up by a battery (not illustrated) and of which the storing state is retained even when the power source of the combined machining apparatus 100 is turned off. A machining program read via the interface 115, a machining program input via the display/MDI unit 170, and the like are stored in the CMOS memory 114. In the present embodiment, the CPU 111 controls the laser machining unit 190 on the basis of the machining program and controls motors corresponding to respective shafts in order to move a work and drive tools whereby laser machining and mechanical machining can be executed in respective steps to be described later.

Various system programs for performing processing in an editing mode required for creating and editing a machining program and performing processing for automated operations are written in advance in the ROM 112.

Various main components such as a machining program for executing the control according to the present embodiment can be input via the interface 115 and the display/MDI unit 170 and can be stored in the CMOS memory 114.

The interface 115 is configured to enable the combined machining apparatus 100 to be connected to the external device 172 such as a data server. The machining program and various parameters and the like are read from the external device 172. Moreover, the machining program edited within the combined machining apparatus 100 can be stored in external storage means via the external device 172.

The PLC (programmable logic controller) 116 outputs signals to an auxiliary device (for example, an actuator called a robot hand for tool replacement) of a machine tool via the I/O unit 117 according to a sequence program included in the combined machining apparatus 100 and controls the auxiliary device. Moreover, the PLC 116 receives signals from various switches of the control panel 171 arranged on a main body of a machine tool, performs necessary processing on the signals, and delivers the processed signals to the CPU 111.

The display/MDI unit 170 is a manual data input device including a display, a keyboard, and the like, and the interface 118 receives commands and data from the keyboard of the display/MDI unit 170 and delivers the commands and data to the CPU 111. The interface 119 is connected to the control panel 171 including a manual pulse generator and the like. The shaft control circuits 130 to 134 of respective shafts receive movement amount commands for respective shafts from the CPU 111 and outputs the commands for respective shafts to the servo amplifiers 140 to 144.

The servo amplifiers 140 to 144 receive the commands to drive the servo motors 150 to 154 of respective shafts. The servo motors 150 to 154 of respective shafts each include a position and speed detector and feed a position and speed feedback signal from the position and speed detector back to the shaft control circuits 130 to 134 to perform feedback control of position and speed. In the block diagram, feedback of position and speed is not illustrated.

The spindle control circuit 160 receives a main shaft rotation command for a main shaft to which a tool for performing mechanical machining is attached and outputs a spindle speed signal to the spindle amplifier 161. Upon receiving the spindle speed signal, the spindle amplifier 161 causes the spindle motor 162 to rotate at the commanded rotation speed to drive a tool attached to the main shaft.

The pulse encoder 163 is coupled to the spindle motor 162 by a gear, a belt, or the like, and the pulse encoder 163 outputs a feedback pulse in synchronization with rotation of the main shaft, and the feedback pulse is read by the CPU 111 via the bus 120. The CPU 111 controls a main shaft rotation command for a machine tool on the basis of the feedback pulse.

The laser control unit 180 receives a laser output command for laser machining on the basis of the machining program from the CPU 111. Here, the laser output command includes instructions such as, for example, a peak power, a frequency, a duty ratio, and the like for radiating a laser beam of a predetermined power. The laser control unit 180 outputs a control signal based on the laser output command to the laser machining unit 190.

The laser machining unit 190 is a unit that includes a laser oscillator that oscillates and emits a laser beam, a machining head and a nozzle that condense the laser beam emitted from the laser oscillator using an optical system to radiate the laser beam to a work. The laser machining unit 190 radiates a laser beam of a predetermined power to a work on the basis of the control signal from the laser control unit 180.

A general method of moving a work or a tool using respective shafts, a general mechanical machining method using a tool attached to a main shaft, and a general laser machining method using the laser machining unit 190 are well known to a person of ordinary skill in the art. Therefore, detailed description and illustrations of these methods will be omitted.

Moreover, the configuration example of the combined machining apparatus 100 is an example only. For example, the present embodiment may employ various mechanical machining such as turning including screw cutting, milling, transferring including knurling, rolling, pressing, spinning, and sandblasting as the mechanical machining using tools. Furthermore, the present embodiment may employ laser machining which uses various lasers such as a carbon dioxide laser ($CO_2$ laser), a YAG laser, a fiber laser, and a diode laser as the laser machining using a laser. In order to realize these various machining methods, the combined machining apparatus 100 may be modified in an arbitrary manner.

For example, in the above-described configuration example, five shaft control circuits 30 to 34 and five servo motors 50 to 54 are used. However, the combined machining apparatus 100 may include an arbitrary number of shaft control circuits and servo motors without being limited thereto. Moreover, although the combined machining apparatus 100 may be realized as a single apparatus, the combined machining apparatus 100 may be realized as a combination of a numerical controller and a machine tool.

Next, respective embodiments will be described in detail. In the following embodiments, a case in which quenching is performed with respect to a work 10 which is a metal material (for example, carbon steel S45C) by laser machining using a laser beam 20 will be described.

In this case, the laser beam 20 is a high power laser such as a carbon dioxide laser ($CO_2$ laser), a YAG laser, a fiber laser, and a diode laser, for example. Moreover, the output power of the laser beam 20 is 10 W to 20 kW, for example. Furthermore, the wavelength of the laser beam 20 ranges from an ultraviolet light to an infrared light, for example.

However, these assumptions are examples for describing respective embodiments and do not limit the applications of the respective embodiments. For example, a material other than the metal material may be used as the work 10.

First Embodiment

Figure 2:
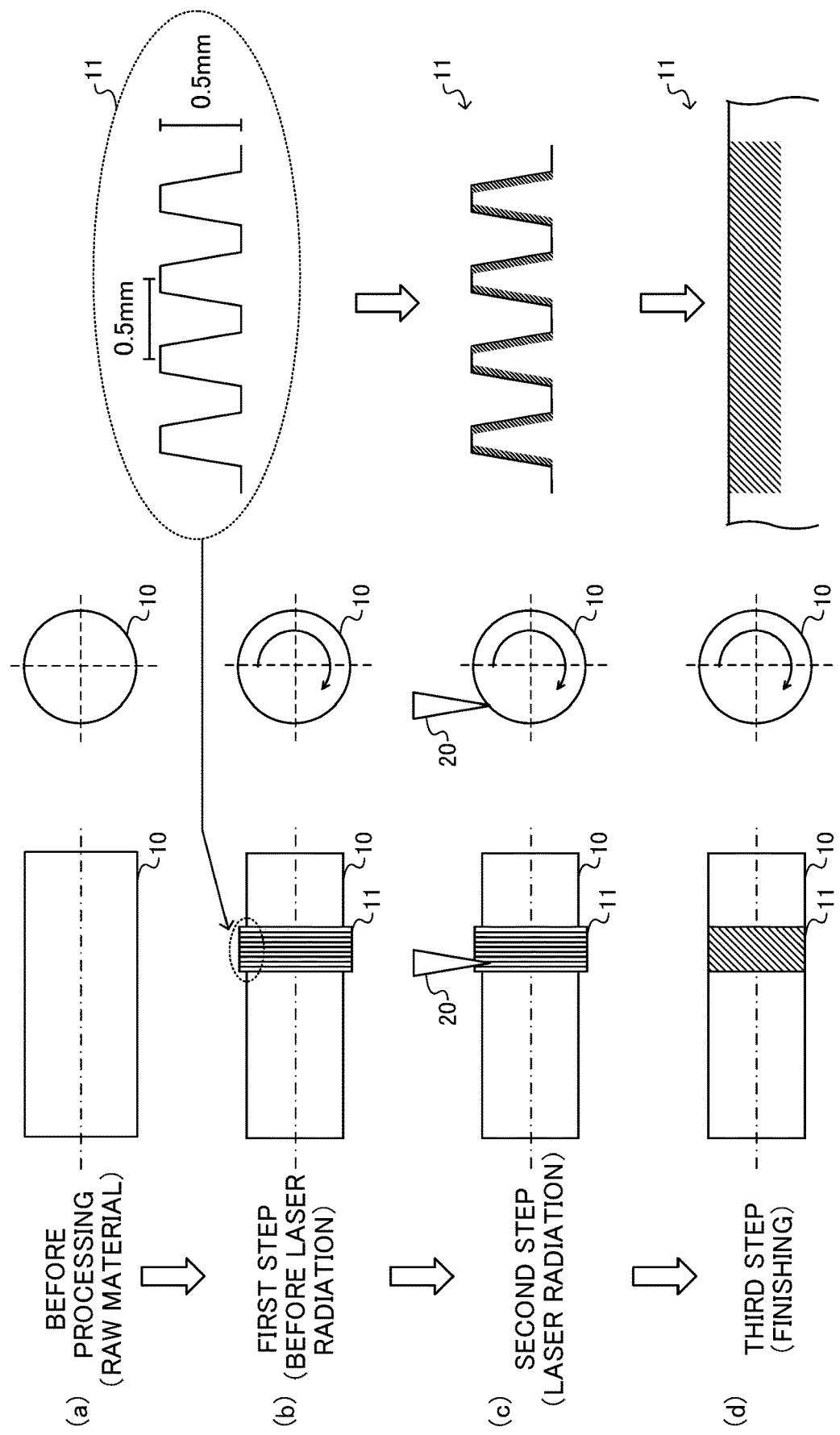
FIG. 2 is a diagram illustrating a first embodiment of the present invention.
Figure 3:
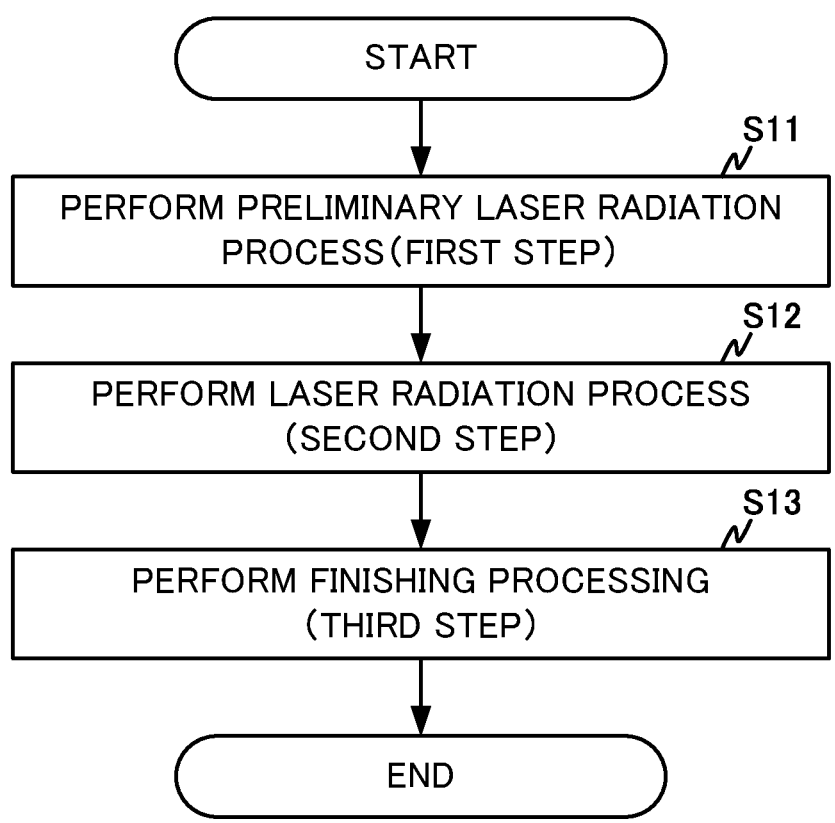
FIG. 3 is a flowchart illustrating a basic operation of an embodiment of the present invention.

Next, a first embodiment will be described. FIG. 2 illustrates mechanical machining and laser machining with respect to the work 10 by the combined machining apparatus 100. Moreover, FIG. 3 illustrates a flowchart of respective steps of the present embodiment. The respective steps to be described later are performed by the above-described combined machining apparatus 100.

First, as illustrated as "(a) before processing (raw material)" in FIG. 2, the work 10 before processing is performed in respective steps has a cylindrical shape. The work 10 is disposed on any one of the axes of the combined machining apparatus 100 so as to rotate about an axis (in the drawing, the rotation axis is indicated by a one-dot chain line) extending in a longitudinal direction of a side surface of the cylindrical shape. The following processes are performed while rotating the work 10, and the rotation speed is 1000 rpm, for example.

Subsequently, in this state, before laser machining is performed, the combined machining apparatus 100 performs mechanical machining with respect to a laser machining target region 11 on the work 10 so that absorptivity of a laser beam becomes appropriate. That is, a preliminary laser radiation process is performed as a first step (step S1 in FIG. 3).

Figure 4:
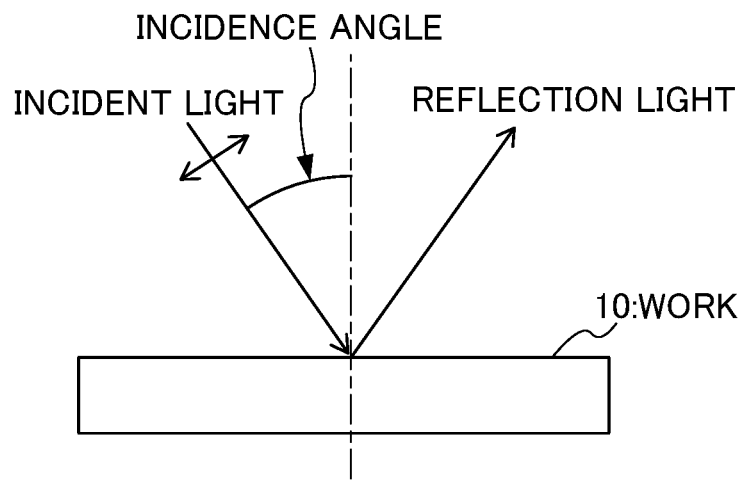
FIG. 4 is a diagram for describing an incidence angle.
Figure 5:
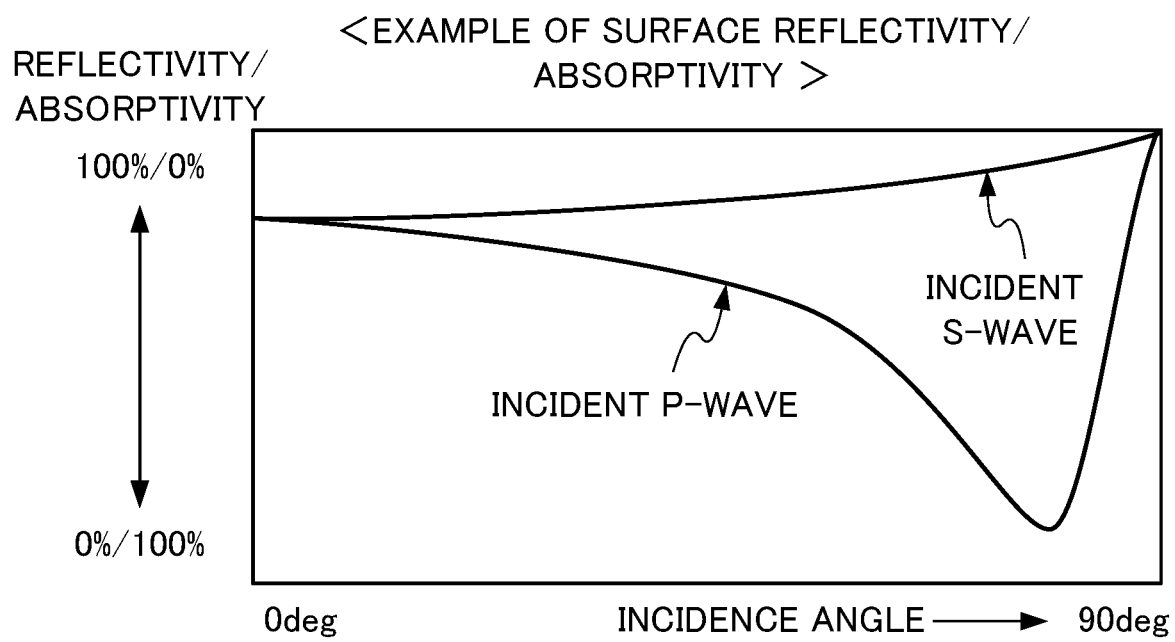
FIG. 5 is a diagram illustrating an example of the percentage of surface reflectivity to surface absorptivity.

Here, the idea of mechanical machining in the first step according to the present embodiment will be described with reference to FIGS. 4 and 5. First, as illustrated in FIG. 4, the angle at which the laser beam 20 is incident perpendicularly with respect to the surface of the work 10 is an incidence angle of 0 (°). In this case, as illustrated in FIG. 5, the absorptivity of the laser beam 20 tends to decrease when the laser beam is incident perpendicularly (incidence angle=0 (°)) and tends to increase when the incidence angle increases (for example, becomes larger than 60 (°)).

Therefore, in the present embodiment, the mechanical machining in the first step is performed by taking this into consideration. For example, when it is desired to increase the absorptivity of the laser beam 20, a surface shape is mechanically machined so that the incidence angle of the laser beam with respect to the laser machining target region 11 increases. On the other hand, when it is desired to decrease the absorptivity of the laser beam 20, a surface shape is mechanically machined so that the incidence angle of the laser beam with respect to the laser machining target region decreases.

As a specific method of mechanical machining, mechanical machining such as turning including screw cutting, milling, transferring including knurling, rolling, pressing, spinning, and sandblasting is performed with respect to the surface of the work 10.

In the present embodiment, in order to increase the absorptivity of the laser beam 20, the surface shape is mechanically machined so that the incidence angle of the laser beam 20 with respect to the laser machining target region increases. Therefore, turning processing is performed so that a region other than the laser machining target region 11 on the surface of the work 10 has a final desired shape. For example, the work 10 has a final desired diameter. Moreover, as illustrated as "(b) first step (before laser radiation)" in FIG. 2, a V-groove having a flat portion in an apex and a trough is repeatedly formed in the laser machining target region 11. The V-grooves are provided in parallel to the rotation axis at a pitch of 0.5 mm, for example. Moreover, the height of the flat portion of the apex of a V-groove is 0.5 mm above the final desired diameter, for example.

In this state, the combined machining apparatus 100 performs laser machining with respect to the laser machining target region 11. Specifically, the laser beam 20 is radiated to the laser machining target region 11 to heat the laser machining target region 11. That is, a laser radiation process is performed as a second step (step S2 in FIG. 3).

Here, since mechanical machining is performed in advance so that the absorptivity of the laser beam 20 becomes appropriate, the laser beam 20 is efficiently absorbed by the work 10. That is, it is possible to perform laser machining efficiently. In this example, since the apexes and the troughs of respective V-grooves are flat portions, the laser beam 20 is incident perpendicularly with respect to the apexes and the troughs and a large part of the laser beam 20 is reflected. In contrast, since the laser beam 20 is obliquely incident on the other portions of the respective V-grooves, the laser beam 20 is absorbed efficiently and the portions are heated strongly. In the respective drawings to be described later, the heated portions are indicated by hatched diagonal lines.

Moreover, the heat applied by heating is transferred from the troughs of the respective V-grooves to the inside of the laser machining target region 11. Here, when laser radiation stops, the heat of the heated portions is quickly transferred to surrounding low-temperature portions and the heated portions are cooled rapidly. Alternatively, the heated portions are rapidly cooled by coolant oil or water. In this way, quenching can be performed up to a predetermined depth inside the laser machining target region 11.

As illustrated as "(c) second step (laser radiation)" in FIG. 2, the laser beam 20 is radiated to a side surface of the work 10 by shifting the laser beam from the center of the work 10 to adjust the incidence angle so that the laser beam 20 is absorbed by the work 10 more efficiently.

Subsequently, the combined machining apparatus 100 performs finishing processing by mechanical machining whereby a desired finishing shape and surface is obtained in addition to desired heat processing. That is, finishing processing is performed as a third step (step S3 in FIG. 3). For example, as illustrated as "(d) third step (finishing)" in FIG. 2, turning processing is performed with respect to the laser machining target region 11, and the V-grooves formed in the laser machining target region 11 are removed so that the laser machining target region 11 has a final desired diameter.

Here, as described above, since quenching can be performed up to a predetermined depth inside the laser machining target region 11, when the surface is subjected to such finishing processing, it is possible to obtain a partially heat-processed component. In the first step, V-grooves are formed and mechanical machining may not be performed in regions other than the laser machining target region 11. In the third step, both the laser machining target region 11 and the regions other than the laser machining target region 11 may be machined so as to have a final desired diameter.

In the present embodiment described above, since laser machining is performed as the second step after mechanical machining of the first step is performed with respect to the laser machining target region 11 to increase the absorptivity of the laser beam 20, it is possible to heat the work 10 efficiently. After that, by performing the third step, it is possible to obtain a desired finishing shape and surface in addition to desired heat processing.

Second Embodiment

Next, a second embodiment will be described with reference to FIG. 6. In the description of respective embodiments subsequent to the second embodiment, the description of portions overlapping those of the first embodiment will be omitted, and differences from those of the first embodiment will be described in detail.

In the first embodiment, mechanical machining for increasing the absorptivity of the laser beam 20 is performed as the first step. In contrast, in the present embodiment, mechanical machining for decreasing the absorptivity is performed as a first step.

The reason therefor is because it is preferable to perform mechanical machining to decrease the absorptivity as the first step depending on a surface property and a state (surface roughness) of the work 10. For example, when the raw material of the work 10 is a cast material, a forged material, or a black-dyed leather, a fine uneven portion is present on the surface of the work 10. The work 10 in which a fine uneven portion is present on the surface is illustrated in "(a) before processing (raw material)" in FIG. 6.

When the laser beam 20 is radiated to the work 10 in such a state, although the absorptivity is increased to be higher than that on a flat surface, the surface is heated generally in a non-uniform manner, which is not desirable.

Figure 6:
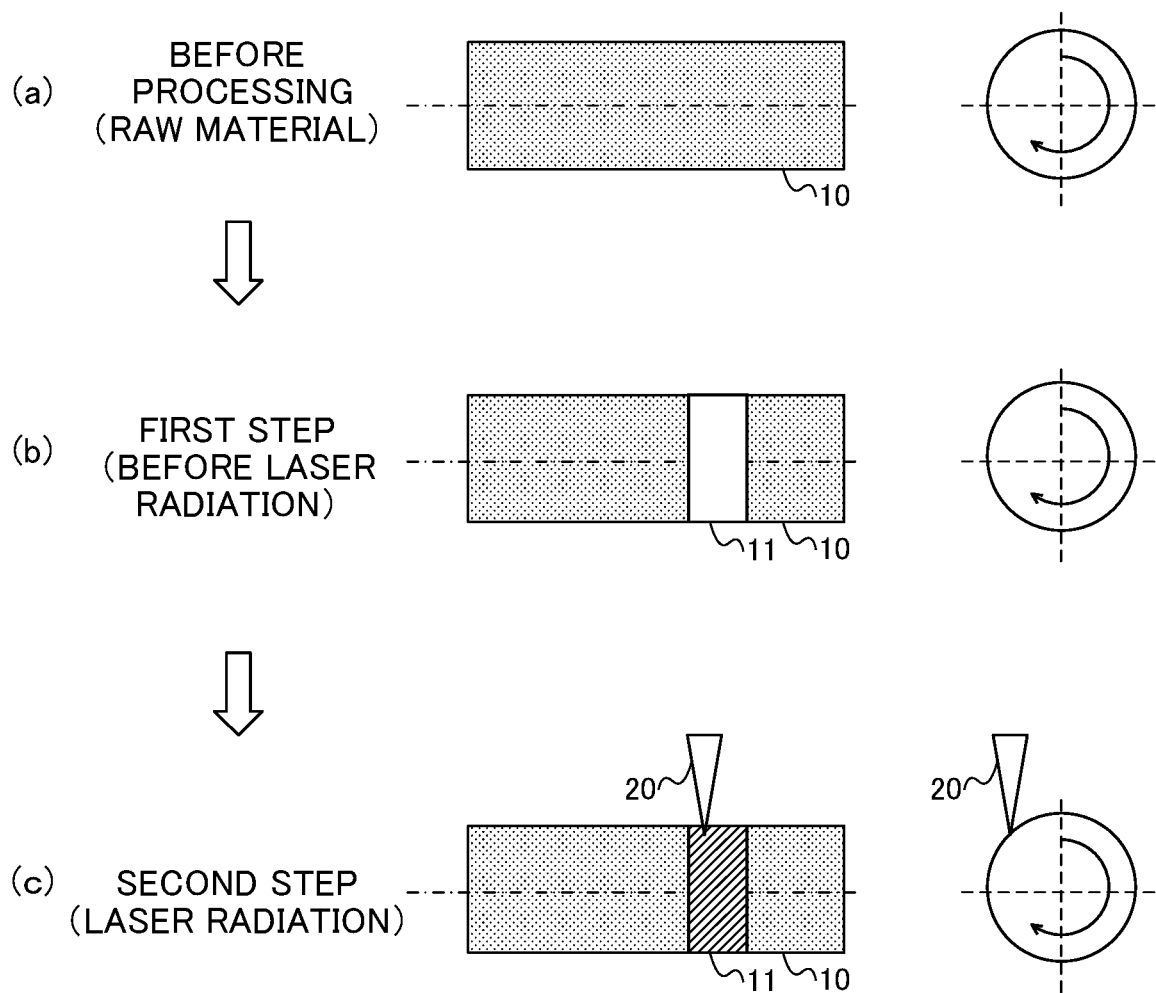
FIG. 6 is a diagram illustrating a second embodiment of the present invention.

Therefore, in the present embodiment, as illustrated as "(b) first step (before laser radiation)" in FIG. 6, polishing or the like is performed with respect to the laser machining target region 11 as the mechanical machining of the first step so that the laser machining target region 11 is changed to a flat metal surface.

After the first step is performed, the laser beam 20 is radiated to the laser machining target region 11 as the second step whereby heating can be performed in a uniform manner. In this way, in the present embodiment, as illustrated in as "(c) second step (laser radiation)" in FIG. 6, it is possible to perform heat processing with respect to the entire laser machining target region 11 in a uniform manner.

In this case, "(d) third step (finishing)" may be performed further, and "(d) third step (finishing)" may be omitted if it is okay if the regions other than the laser machining target region 11 on the surface of the work 10 are a black-dyed leather or the like.

Third Embodiment

Next, a third embodiment will be described with reference to FIG. 7. In the present embodiment, reflection light when the laser beam 20 is radiated to the work 10 is taken into consideration.

When a laser beam 20a (an incident light beam) which is incident light is incident perpendicularly or the incidence angle is small, a laser beam 20b (a reflection light beam) which is reflection light passes through an aperture of a laser oscillator that emitted the laser beam 20 and returns to the laser oscillator. When the laser beam 20 returns to the laser oscillator, the laser oscillator may be broken.

Therefore, in the present embodiment, the occurrence of such a situation is prevented. Specifically, as illustrated as "(b) first step (before laser radiation)" in FIG. 7, a mountain shape is repeatedly formed on the surface of the laser machining target region 11 by the mechanical machining of the first step.

Figure 7:
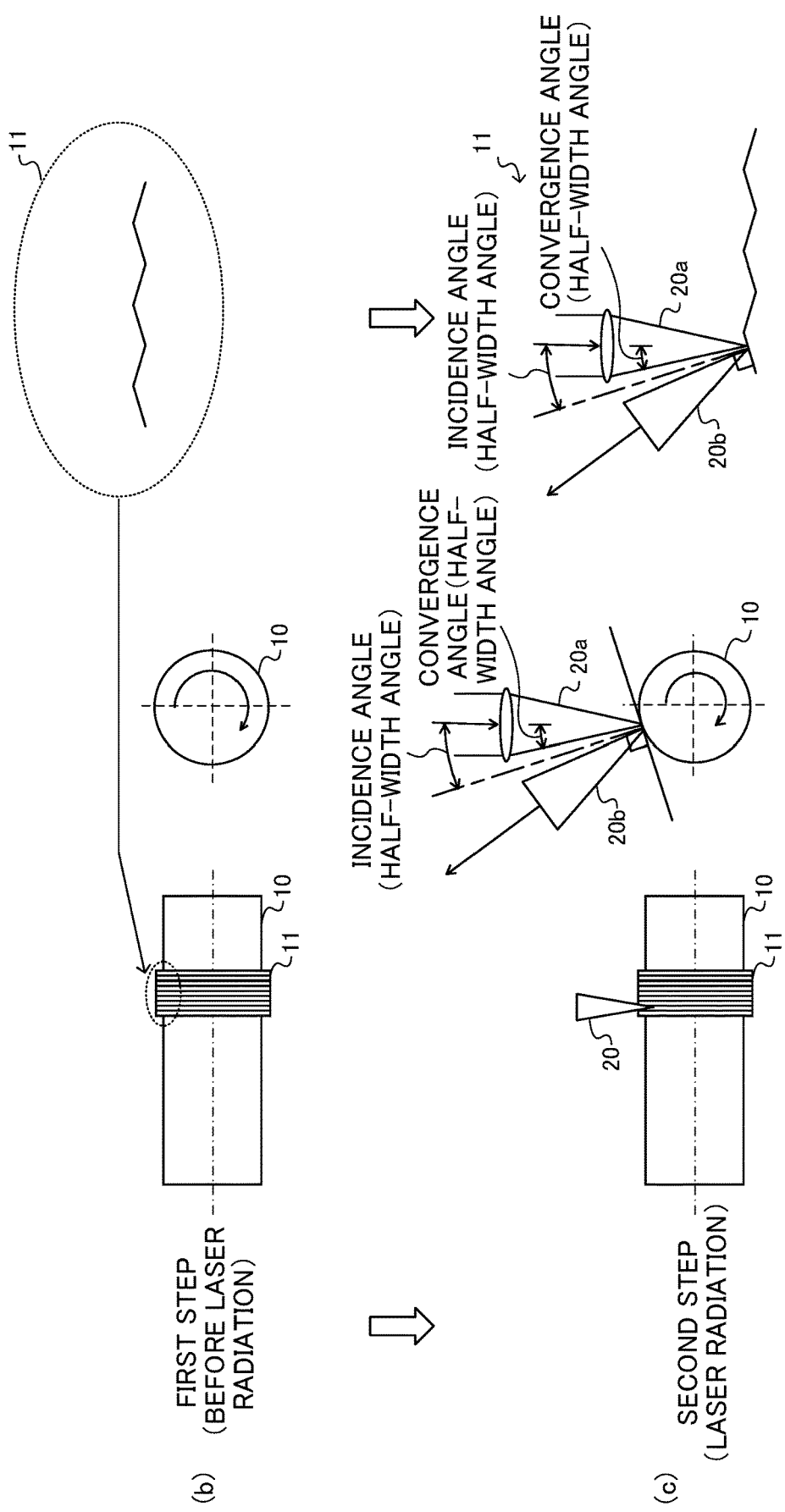
FIG. 7 is a diagram illustrating a third embodiment of the present invention.

In this way, as illustrated as "(c) second step (laser radiation)" in FIG. 7, an incidence angle represented by a half-width angle of the laser beam 20a (an incident light beam) which is an incident light on the mountain shape is equal to or larger than a convergence angle represented by a half-width angle. By doing so, the reflection light (reflection light beam) does not return to the laser oscillator.

As described in the first embodiment, as illustrated as "(c) second step (laser radiation)" in FIG. 7, the laser beam 20 is radiated to the side surfaces of the work 10 by shifting the laser beam from the center of the work 10. In this way, since the incidence angle represented by the half-width angle of the laser beam 20a (incident light beam) which is an incident light becomes equal to or larger than the convergence angle represented by the half-width angle, the laser beam 20b (reflection light beam) which is a reflection light does not return to the laser oscillator.

In the present embodiment described above, since the incidence angle represented by the half-width angle of the laser beam 20a (incident light beam) which is an incident light becomes equal to or larger than the convergence angle represented by the half-width angle, it is possible to prevent the laser beam 20b (reflection light beam) which is a reflection light from returning to the laser oscillator. Moreover, in this case, since the laser beam 20b (reflection light beam) which is a reflection light is absorbed by the surrounding outside the aperture, a particular problem does not occur.

Fourth Embodiment

Figure 8:
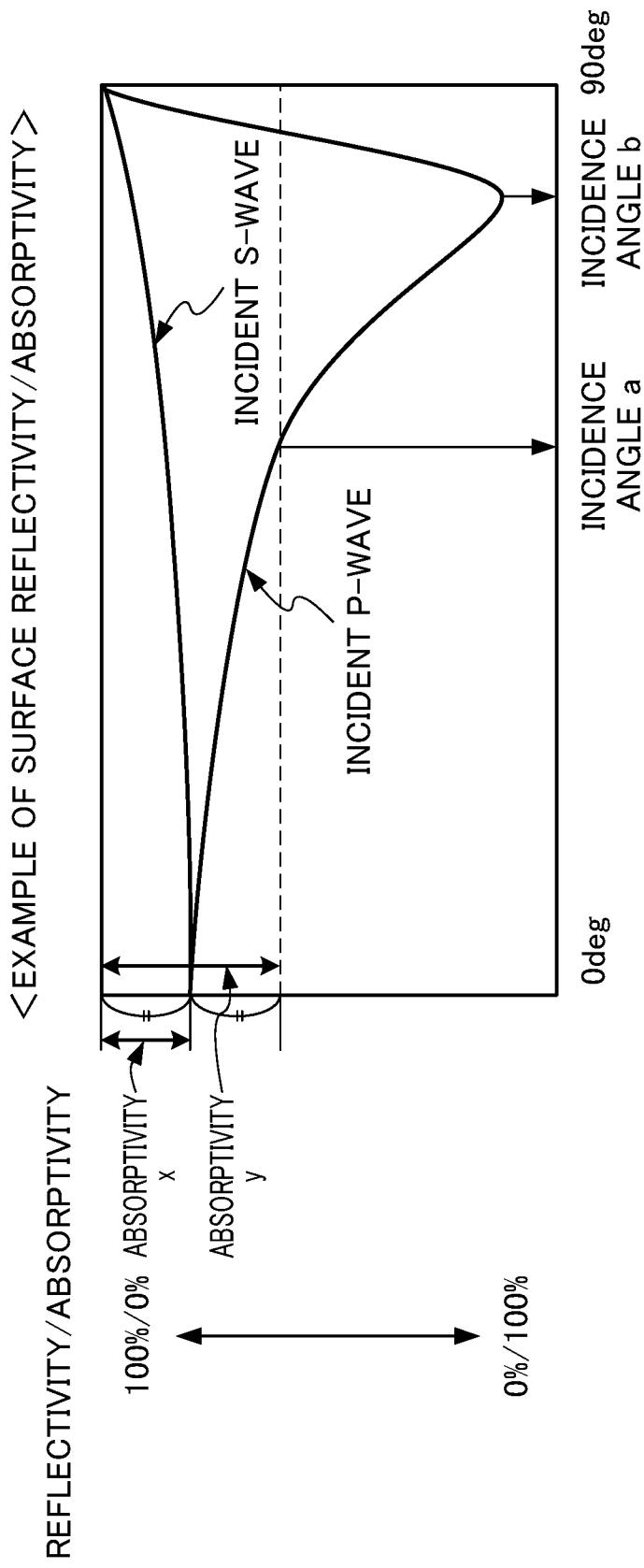
FIG. 8 is a diagram illustrating a fourth embodiment of the present invention.

Next, a fourth embodiment will be described with reference to FIG. 8. The present embodiment exhibits a remarkable effect in heating by the laser beam 20 in the mechanical machining of the first step.

In the present embodiment, when the laser beam 20 of randomly or circularly polarized light is radiated to heat a material, the absorptivity (corresponding to the absorptivity y in FIG. 8) of a P-wave component only is larger than the absorptivity (corresponding to twice the absorptivity x in FIG. 8) of the laser beam 20 of the sum of S- and P-wave components at an incidence angle of 0 (°). That is, in the example of FIG. 8, the incidence angle is controlled to be equal to or larger than a (°). At the incidence angle a (°), as illustrated in the drawing, the absorptivity y is twice the absorptivity x.

In this manner, in the mechanical machining of the first step, by processing the surface shape of the work 10 so that the incidence angle is equal to or larger than a (°), the heating by the laser beam 20 becomes remarkably efficient. Moreover, when the surface shape of the work 10 is processed so that the incidence angle is equal to or larger than b (°) at which the absorptivity of the P-wave component is the highest, it is possible to obtain a more remarkably heating effect. The present embodiment is particularly suitable when the laser beam 20 which includes the P-wave only but does not include the S-wave is used.

Fifth Embodiment

Figure 9:
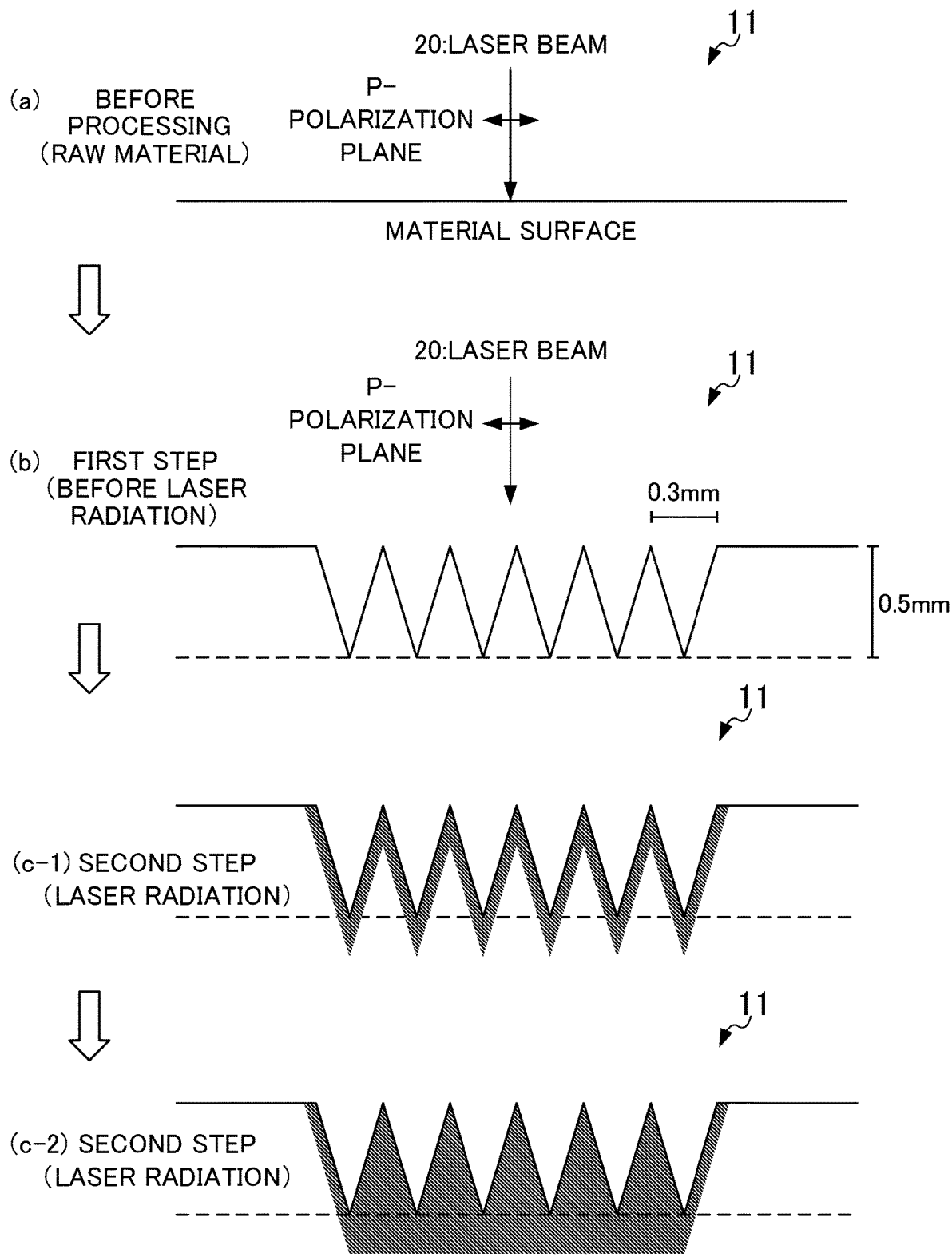
FIG. 9 is a diagram illustrating a fifth embodiment of the present invention.

Next, a fifth embodiment will be described with reference to FIG. 9. In the present embodiment, as illustrated as "(a) before processing (raw material)" in FIG. 9, the mechanical machining of the first step is performed with respect to the surface shape of the laser machining target region 11 which is horizontal to the P-polarization plane so that V-grooves are formed closely to each other at a pitch of 0.3 mm, for example, as illustrated as "(b) first step (before laser radiation)". Although the pitch is 0.3 mm in the drawing, the V-grooves may be formed more closely to each other. For example, the pitch may be selected arbitrarily in the range of 0.05 mm and 3 mm. Here, the V-grooves can be easily produced by screw cutting or the like.

Subsequently, as illustrated as "(C-1) second step (laser radiation)" in FIG. 9, the laser beam 20 is radiated as the second step. In this respect, the incidence angle of the laser beam 20 with respect to the respective inclined surfaces of the V-groove increases. Due to this, the respective inclined surfaces of the V-groove are efficiently heated by absorbing the laser beam 20.

In this respect, when the plurality of V-grooves rather than the respective V-grooves are macroscopically focused on, it is understood that the apparent absorptivity of the entire laser machining target region 11 which is a flat surface on which the plurality of V-grooves are formed can be increased. Therefore, as illustrated as "(C-2) second step (laser radiation)" in FIG. 9, the heat applied to the plurality of V-grooves by the radiation of the laser beam propagates through the inside of the laser machining target region 11 from the respective V-grooves. In this way, heat processing can be performed up to a predetermined depth inside the laser machining target region 11.

According to the present embodiment described above, by forming the V-grooves at a fine pitch, it is possible to increase the apparent absorptivity of the entire laser machining target region 11 which is macroscopically a flat surface.

Sixth Embodiment

Next, a sixth embodiment will be described with reference to FIG. 10. The present embodiment is particularly suitable when a final desired shape obtained by the third step is such a shape that does not easily absorb the laser beam 20.

Figure 10:
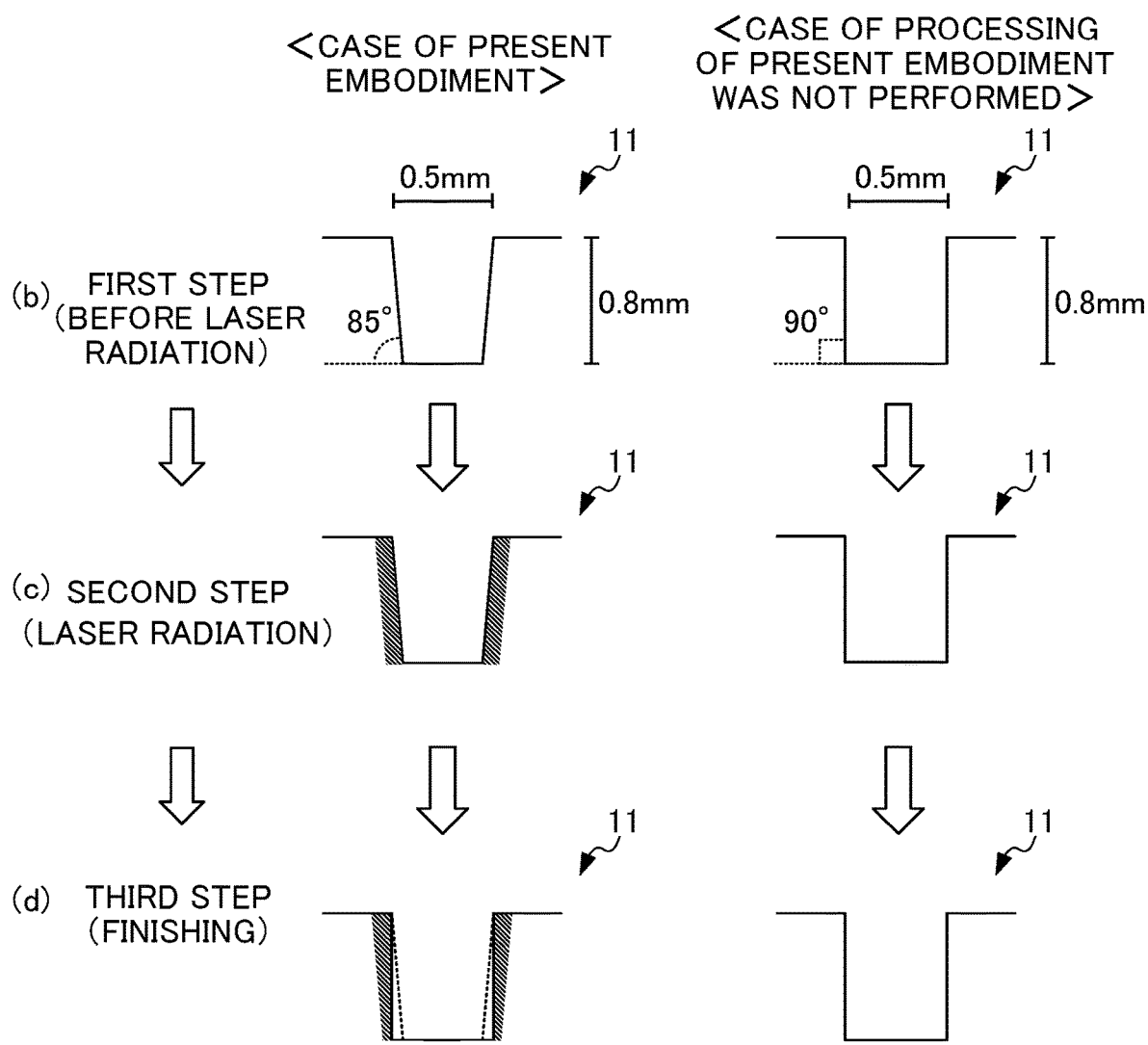
FIG. 10 is a diagram illustrating a sixth embodiment of the present invention.

In the present embodiment, by the mechanical machining of the first step, grooves having a width of 0.5 mm and a depth of 0.8 mm are formed in the laser machining target region 11 so that the side surfaces have an angle of 85 (°) as illustrated as <case of present embodiment> in "(b) first step (before laser radiation)" in FIG. 10.

The laser beam 20 is radiated to the laser machining target region 11 in the second step so that the laser beam 20 is absorbed by the side surfaces of the grooves to heat the side surfaces as illustrated as <case of present embodiment> in "(c) second step (laser radiation)" in FIG. 10. In this way, heat processing (in this example, quenching) can be performed up to a predetermined thickness.

By the mechanical machining of the third step, the side surfaces are finish-processed in a rectangular form as illustrated as <case of present embodiment> in "(d) third step (finishing)" in FIG. 10. In this case, since quenching can be performed up to a predetermined thickness, the side surfaces after the finishing processing was performed are in a quenched state. A case where the processing of the present embodiment was not performed will be described with reference to <case where processing of present embodiment was not performed> in FIG. 10.

It is assumed that the mechanical machining of the first step was performed so that grooves having a width of 0.5 mm and a depth 0.8 mm were formed in a rectangular form in the laser machining target region 11 so that the side surfaces had an angle of 90 (0) as illustrated as <case where processing of present embodiment was not performed> in "(b) first step (before laser radiation)" in FIG. 10.

It is also assumed that the laser beam 20 was radiated in the second step. In this case, as illustrated as <case where processing of present embodiment was not performed> in "(c) second step (laser radiation)" in FIG. 10, since the laser beam 20 is rarely radiated to the side surfaces of the grooves, the side surface of the grooves are rarely heated. Moreover, in the flat portions at the troughs of the grooves, since the laser beam 20 is incident perpendicularly, the flat portions at the troughs are not heated sufficiently, As a result, since the entire rectangular form that forms the groove is not heated, quenching is not performed.

In contrast, as described above, according to the present embodiment, since quenching can be performed up to a predetermined depth of the side surfaces, the side surfaces after the finishing processing was performed are in a quenched state. That is, according to the present embodiment, the sheer side surfaces can be heat-processed.

Seventh Embodiment

Figure 11A:
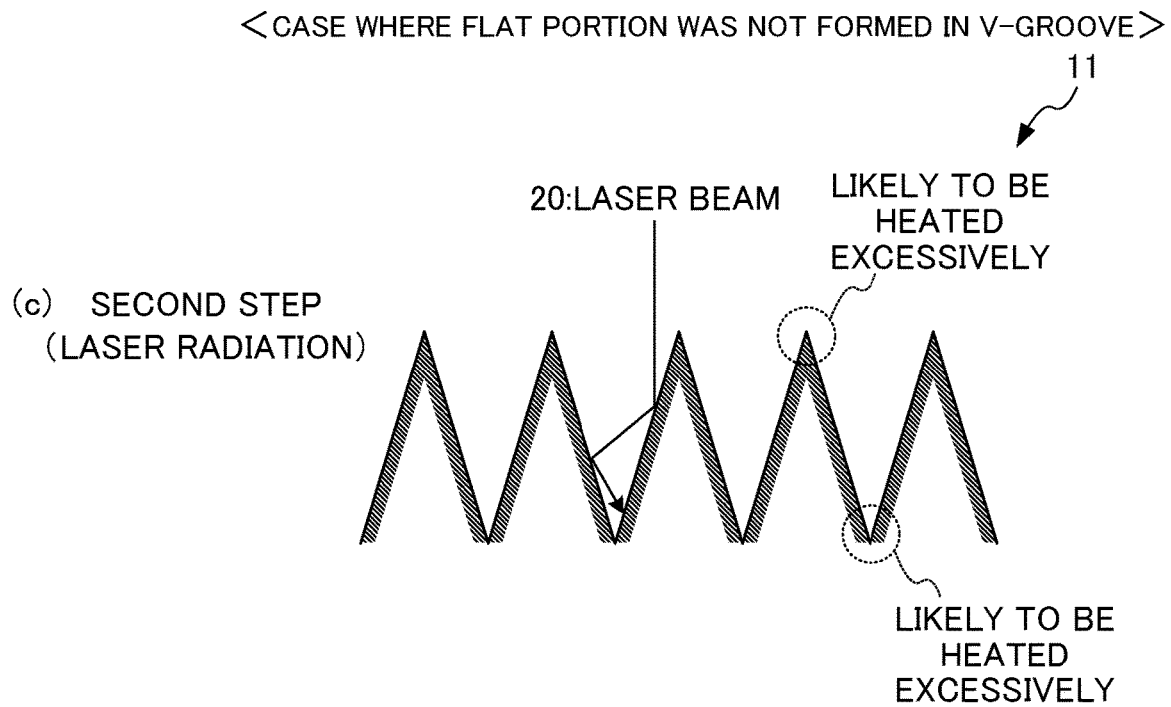
FIG. 11A is a diagram (1/2) illustrating a seventh embodiment of the present invention.

Next, a seventh embodiment will be described with reference to FIGS. 11A and 11B. The present embodiment prevent excessive heating of a portion of the laser machining target region 11 as the result of the mechanical machining of the first step.

First, with reference to FIGS. 11A and 11B, a case in which V-grooves are repeatedly formed in the laser machining target region 11 but the flat portion is not formed will be described. In this case, the absorptivity in the V-groove is improved. Furthermore, the laser beam 20 is repeatedly reflected to reach the troughs of the V-grooves. Due to this, as illustrated as "(c) second step (laser radiation)" in FIG. 11A, the ridges of the repeated V-grooves are excessively heated from both side surfaces, and the troughs are likely to heated excessively due to concentration of the laser beam. In this case, although it depends on the type of the laser beam 20 used for laser machining and the material or the like of the work 10, even if quenching is to be performed by heating the work 10 at a temperature lower than the melting point thereof, the work 10 may be heated to a temperature exceeding the melting point thereof.

Figure 11B:
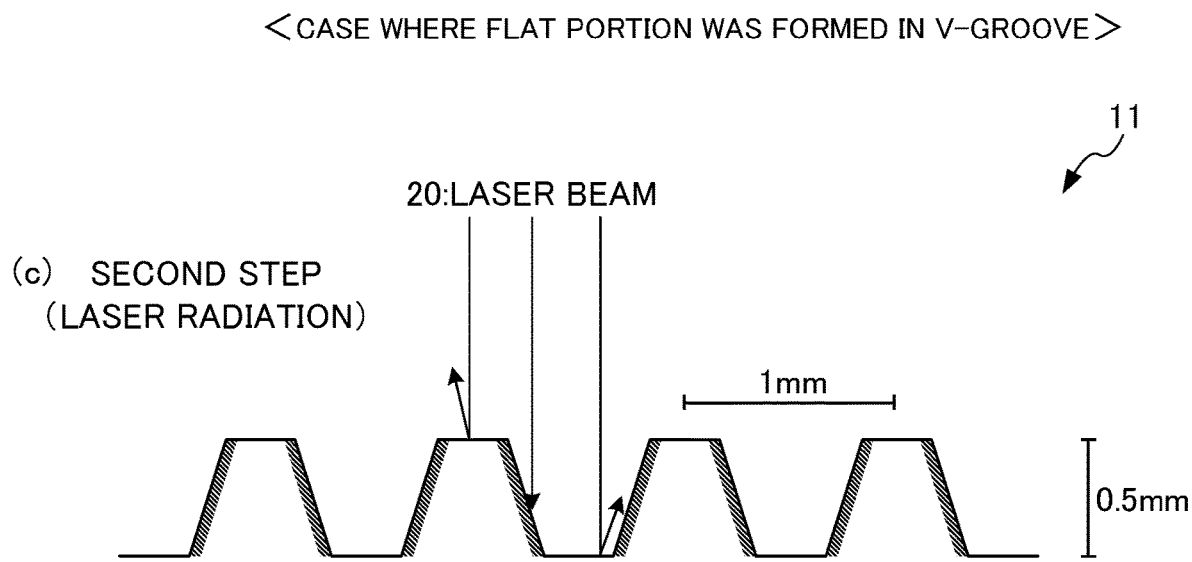
FIG. 11B is a diagram (2/2) illustrating the seventh embodiment of the present invention.

Therefore, as illustrated as "(c) second step (laser radiation)" in FIG. 11B, a flat portion is formed in the apexes and the troughs of the repeated V-grooves. By doing so, since the absorptivity in the flat portion is low, it is possible to prevent excessive heating of a portion of the apexes and the troughs unlike FIG. 11A. Therefore, it is possible to heat the entire laser machining target region in a uniform manner. In the case of FIG. 11B, the pitch of the repeated V-grooves is 1 mm, for example. Moreover, the height of the flat portion at the apex of the V-groove is 0.5 mm, for example.

Eighth Embodiment

Next, an eighth embodiment will be described with reference to FIGS. 12A and 12B. In the present embodiment, a method of the mechanical machining of the first step is taken into consideration.

Figure 12A:
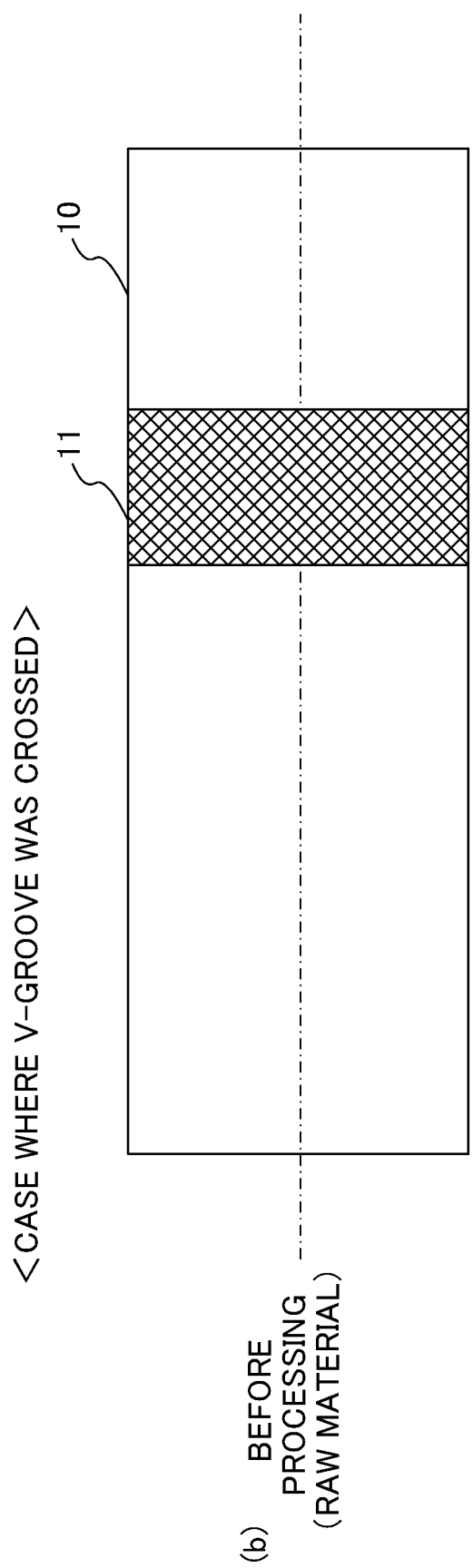
FIG. 12A is a diagram (1/2) illustrating an eighth embodiment of the present invention.

As illustrated as "(b) first step (before laser radiation)" in FIG. 12A, knurling processing is performed with respect to the laser machining target region 11 so that a number of concave or convex cones or truncated cones are formed on the surface of the laser machining target region 11. In this way, it is possible to increase the absorptivity of the laser beam 20.

Knurling processing can be realized by performing cutting so as to cross the V-grooves to form pattern into the surface thereof, for example. Besides this, knurling processing can be realized by rolling, for example. Specifically, the same can be realized by pressing a mold for knurling against the work 10 to imprint the shape of the mold on the work to plastically deform the work 10.

Figure 12B:
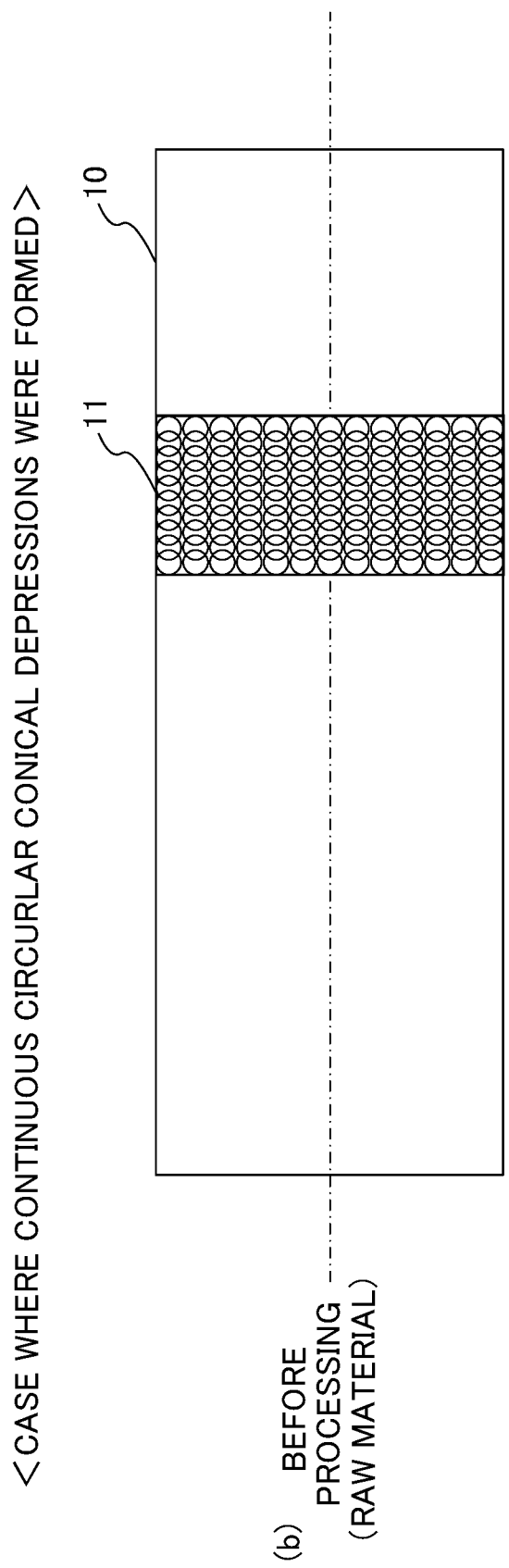
FIG. 12B is a diagram (2/2) illustrating the eighth embodiment of the present invention.

As illustrated as "(b) first step (before laser radiation)" in FIG. 12b, the absorptivity of the laser beam 20 can be increased by forming circular conical depressions in the laser machining target region 11. In this case, the circular conical depressions may be formed by cutting or rolling. According to the present embodiment described above, the mechanical machining of the first step can be realized by various methods.

Ninth Embodiment

Next, a ninth embodiment will be described with reference to FIG. 13. In the respective embodiments described above, although quenching has been described as an example of the laser machining of the second step, welding will be described as an example of the laser machining of the second step in the present embodiment and the subsequent tenth embodiment.

First, the case of the present embodiment will be described. The work 10 in FIG. 13 has a cylindrical shape similarly to those illustrated in the above-described respective embodiments, and FIG. 13 illustrates a cross-sectional view of the work 10. As illustrated as <case of present embodiment> in "(A) before processing (raw material)" in FIG. 13, the end surfaces of two cylindrical works 10 are brought into contact with each other.

Figure 13:
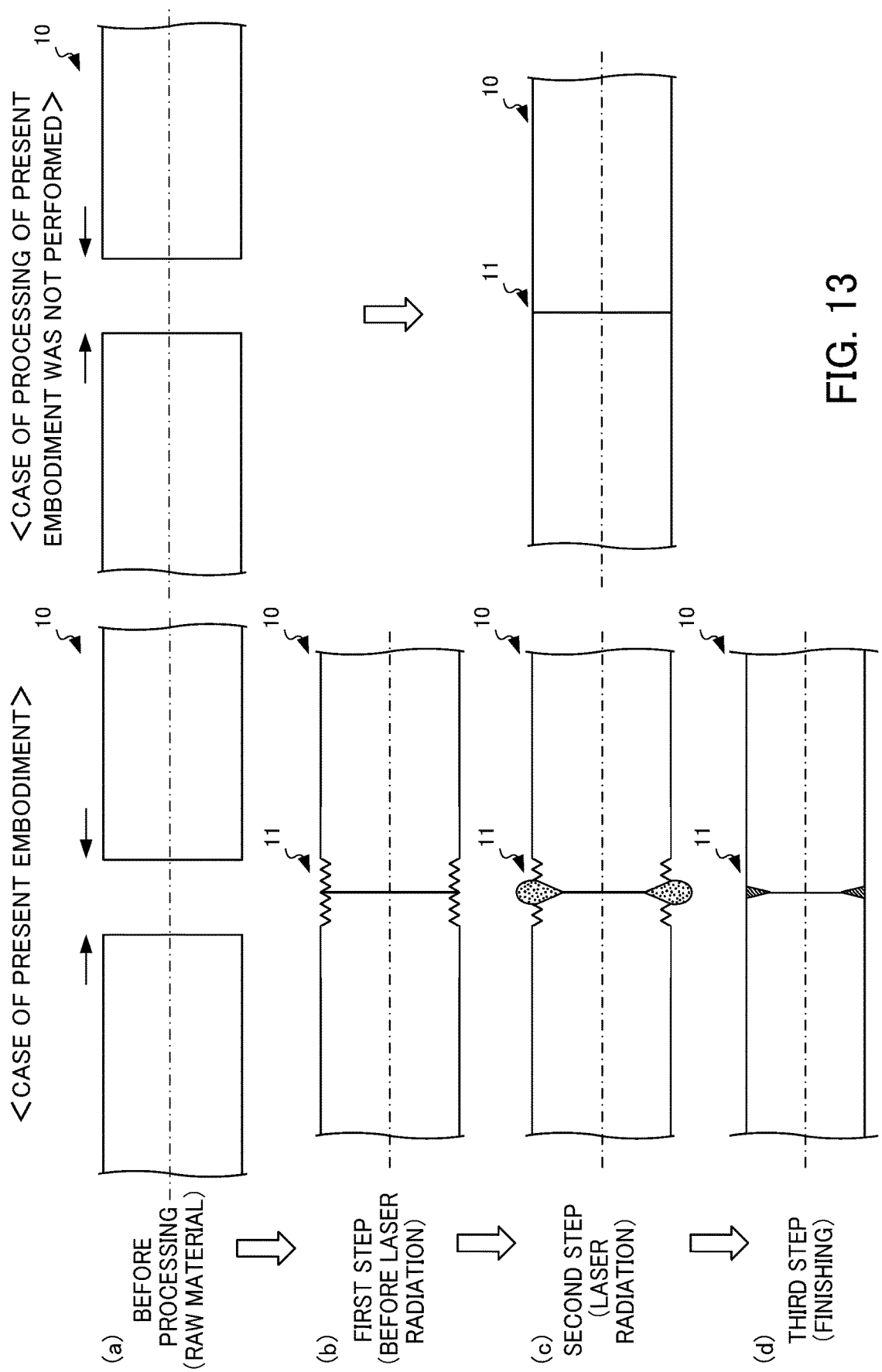
FIG. 13 is a diagram illustrating a ninth embodiment of the present invention.

Moreover, the mechanical machining of the first step is performed so that a shape for increasing the absorptivity of the laser beam 20 is formed in the laser machining target region 11 using the end portions of the two cylindrical works 10 as the laser machining target region 11 as illustrated as <case of present embodiment> in "(c) second step (laser radiation)" in FIG. 13. For example, repeated V-grooves are formed.

The laser beam 20 is radiated to the laser machining target region 11 in the second step. In this respect, since the absorptivity in the laser machining target region 11 is increased by the first step, the end portions of the two cylindrical works 10 are sufficiently heated and the temperature exceeds the melting point of the work 10 as illustrated as <case of present embodiment> in "(c) second step (laser radiation)" in FIG. 13. In this way, the end portions of the two cylindrical works 10 are melted and the two cylindrical works 10 are welded together. In the present embodiment described above, since the absorptivity in the laser machining target region 11 is increased in the first step, it is possible to perform welding efficiently.

Although the object of performing welding can be achieved in this state, a third step may be performed further as necessary. For example, as illustrated as "(d) third step (finishing)" in FIG. 13, turning processing may be performed with respect to the laser machining target region 11 to remove the V-grooves repeatedly formed in the laser machining target region 11 and swelling portions formed during welding so that the laser machining target region 11 has a finally desired diameter. A case where the processing of the present embodiment was not performed will be described with reference to <case where processing of present embodiment was not performed> in FIG. 13.

As illustrated in as <case where processing of present embodiment was not performed> in "(A) before processing (raw material)" in FIG. 13, the end surfaces of two cylindrical works 10 are brought into contact with each other similarly to the present embodiment. In the case where the processing of the present embodiment was not performed, the first step is not performed.

After that, it is assumed that the laser beam 20 was radiated in the second step. In this case, as illustrated as <case where processing of present embodiment was not performed> in "(c) second step (laser radiation)" in FIG. 13, since the mechanical machining for improving the absorptivity was not performed with respect to the laser machining target region 11, the end portions of the two cylindrical works 10 are not heated sufficiently and the temperature does not exceed the melting point of the work 10 or it takes a consideration time for the temperature to exceed the melting point.

In contrast, in the present embodiment, as described above, since the absorptivity in the laser machining target region 11 is increased in the first step, it is possible to perform welding efficiently.

Tenth Embodiment

Figure 14:
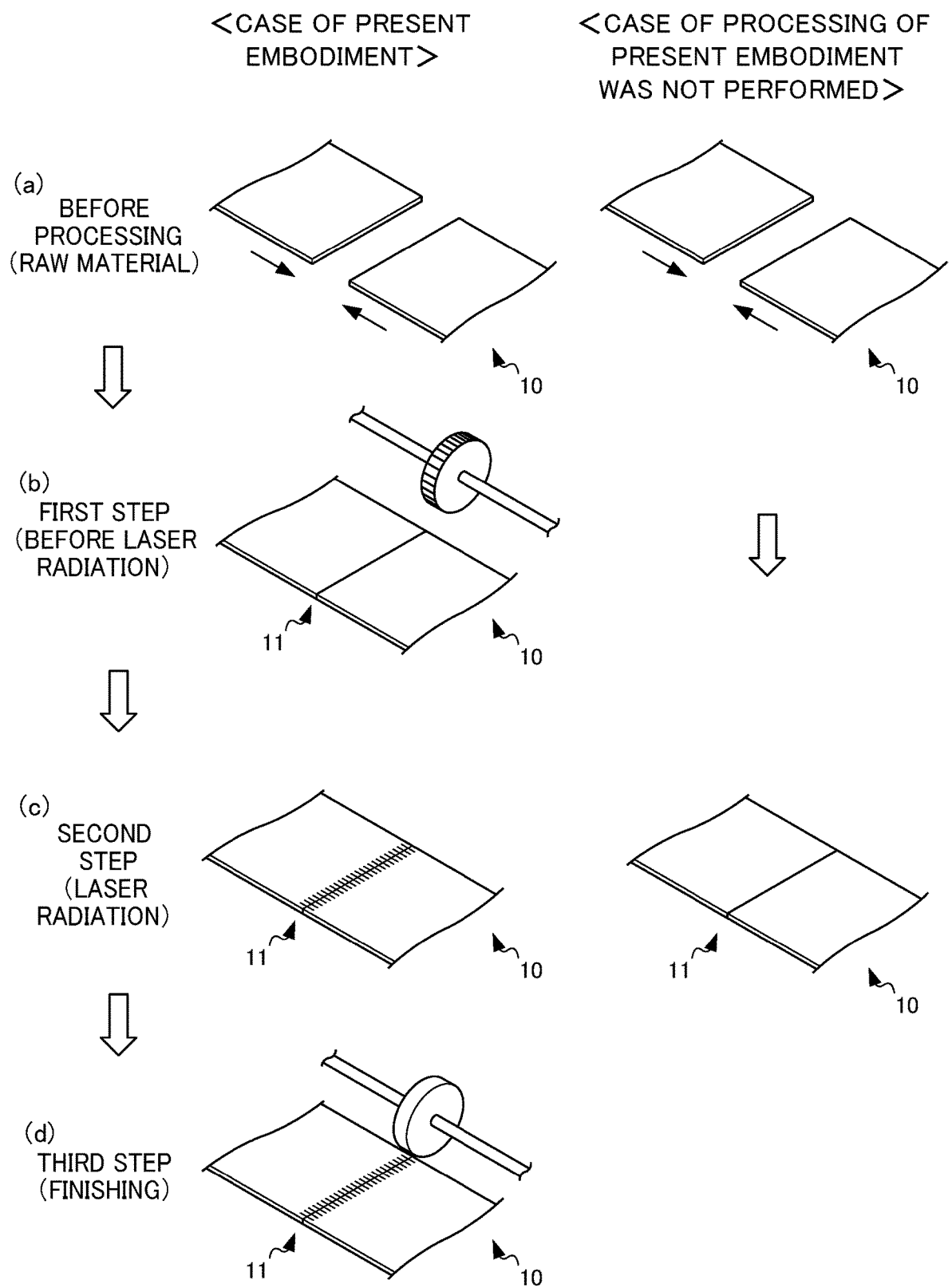
FIG. 14 is a diagram illustrating a tenth embodiment of the present invention.

A tenth embodiment will be described with reference to FIG. 14. In the present embodiment, welding will be described as an example of the laser machining of the second step. Here, although the end portions of two cylindrical works 10 are welded in the ninth embodiment, the end portions of two sheet-shaped works 10 are welded in the present embodiment.

First, the case of the present embodiment will be described. As illustrated as <case of present embodiment> in "(A) before processing (raw material)" in FIG. 14, the end surfaces of two sheet-shaped works 10 are brought into contact with each other. Moreover, the mechanical machining of the first step is performed so that a shape for increasing the absorptivity of the laser beam 20 is formed in the laser machining target region 11 using the end portions of the two sheet-shaped works 10 as the laser machining target region 11 as illustrated as <case of present embodiment> in "(c) second step (laser radiation)" in FIG. 14. For example, repeated V-grooves are formed. In this case, the repeated V-grooves are formed by performing such mechanical machining that a mold is pressed against the work to transfer a shape thereto similarly to the knurling processing, for example.

The laser beam 20 is radiated to the laser machining target region 11 in the second step. In this respect, since the absorptivity in the laser machining target region 11 is increased by the first step, the end portions of the two sheet-shaped works 10 are sufficiently heated and the temperature exceeds the melting point of the work 10 as illustrated as <case of present embodiment> in "(c) second step (laser radiation)" in FIG. 14. In this way, the end portions of the two sheet-shaped works 10 are melted and the two sheet-shaped works 10 are welded together. In the present embodiment described above, since the absorptivity in the laser machining target region 11 is increased in the first step, it is possible to perform welding efficiently.

Although the object of performing welding can be achieved in this state, a third step may be performed further as necessary. For example, as illustrated as "(d) third step (finishing)" in FIG. 14, mechanical machining using a spur roll or press processing may be performed with respect to the laser machining target region 11 so that the laser machining target region 11 is finish-processed into a flat surface.

A case where the processing of the present embodiment was not performed will be described with reference to <case where processing of present embodiment was not performed> in FIG. 14. As illustrated in as <case where processing of present embodiment was not performed> in "(A) before processing (raw material)" in FIG. 14, the end surfaces of two sheet-shaped works 10 are brought into contact with each other similarly to the present embodiment. In the case where the processing of the present embodiment was not performed, the first step is not performed.

After that, it is assumed that the laser beam 20 was radiated in the second step. In this case, as illustrated as <case where processing of present embodiment was not performed> in "(c) second step (laser radiation)" in FIG. 14, since the mechanical machining for improving the absorptivity was not performed with respect to the laser machining target region 11, the end portions of the two sheet-shaped works 10 are not heated sufficiently and the temperature does not exceed the melting point of the work 10 or it takes a consideration time for the temperature to exceed the melting point.

In contrast, in the present embodiment, as described above, since the absorptivity in the laser machining target region 11 is increased in the first step, it is possible to perform welding efficiently.

The above-described combined machining apparatus can be realized by hardware, software, or a combination thereof. Moreover, the combined machining method performed by the above-described combined machining apparatus can be realized by hardware, software, or a combination thereof. Here, being realized by software means being realized when a computer reads and executes a program.

The programs can be stored on any of various types of non-transitory computer readable media and be provided to a computer. The non-transitory computer readable media include various types of tangible storage media. Examples of the non-transitory computer readable media include a magnetic recording medium (for example a flexible disk, a magnetic tape, and a hard disk drive), a magneto-optical recording medium (for example a magneto-optical disk), a CD-ROM (Read Only Memory), a CD-R, a CD-R/W, a semiconductor memory (for example a mask ROM, a PROM (Programmable ROM), an EPROM (Erasable PROM), a flash ROM, and a RAM (Random Access Memory)). The programs may be provided to a computer by using any of various types of transitory computer readable media. Examples of the transitory computer readable media include electric signals, optical signals and electromagnetic waves. A transitory computer readable medium can provide programs to a computer through a wired communication path such as an electrical cable, optical fiber, or the like or a wireless communication path.

Although the respective embodiments are preferred embodiments of the present invention, the scope of the present invention is not to be limited to the afore-mentioned respective embodiments, and the present invention can be modified in various ways without departing from the gist of the present invention. For example, respective embodiments may be combined with each other without departing from the gist of the present invention.

EXPLANATION OF REFERENCE NUMERALS

10: Work
11: Laser machining target region
20: Laser beam
100: Combined machining apparatus
111: CPU
112: ROM
113: RANI
114: CMOS memory
115, 118, 119: Interface
116: PLC
117: I/O unit
120: Data communication bus
130 to 134: Shaft control circuit
140 to 144: Servo amplifier
150 to 154: Servo motor
160: Spindle control circuit
161: Spindle amplifier
162: Spindle motor
163: Pulse encoder
170: Display/MDI unit
171: Control panel
172: External device
180: Laser control unit
190: Laser machining unit

What is claimed is:

1. A combined machining method performed by an apparatus including laser machining means and mechanical machining means, the method comprising:
    a first step of performing mechanical machining with respect to a laser machining target region which is a target of laser machining on a machining target so that the laser machining target region has a surface shape having a predetermined absorptivity of a laser beam; and
    a second step of radiating a laser beam to the laser machining target region to heat the machining target after the first step ends.

2. The combined machining method according to claim 1, further comprising:
    a third step of performing mechanical machining with respect to the laser machining target region so that the machining target has a desired shape and/or a desired surface.

3. The combined machining method according to claim 1, wherein
    the mechanical machining in the first step involves forming the laser machining target region so as to have a surface shape in which the absorptivity of the laser beam is increased.

4. The combined machining method according to claim 3, wherein
    the surface shape in which the absorptivity of the laser beam is increased is a surface shape in which an incidence angle represented by a half-width angle of the laser beam with respect to the surface shape is equal to or larger than a convergence angle represented by a half-width angle of the laser beam.

5. The combined machining method according to claim 3, wherein
the surface shape in which the absorptivity of the laser beam is increased is a surface shape in which an absorptivity of a P-wave component at an incidence angle of the laser beam with respect to the surface shape is equal to or larger than an absorptivity of a sum of a P-wave component and a S-wave component when the laser beam is incident perpendicularly.

6. The combined machining method according to claim 3, wherein
the surface shape in which the absorptivity of the laser beam is increased is a surface shape including a V-groove shape.

7. The combined machining method according to claim 6, wherein
the surface shape in which the absorptivity of the laser beam is increased is a surface shape including a repetition of the V-groove shape.

8. The combined machining method according to claim 7, wherein
each of the V-grooves of the surface shape including a repetition of the V-groove shape has a flat portion in an apex and/or a trough of the V-groove.

9. The combined machining method according to claim 3, wherein
the surface shape in which the absorptivity of the laser beam is increased is a surface shape including a concave or convex cone or truncated cone.

10. The combined machining method according to claim 1, wherein the mechanical machining in the first step involves forming the laser machining target region so as to have a surface shape in which the absorptivity of the laser beam is decreased.

11. The combined machining method according to claim 1, wherein
the mechanical machining in the first step involves forming the laser machining target region so as to have a surface shape in which the absorptivity of the laser beam is uniform in the entire laser machining target region.

12. A non-transitory computer readable medium having a combined machining program recorded therein, the program causing an apparatus including laser machining means and mechanical machining means to function as an apparatus that performs a combined machining method comprising:
a first step of performing mechanical machining with respect to a laser machining target region which is a target of laser machining on a machining target so that the laser machining target region has a surface shape having a predetermined absorptivity of a laser beam; and
a second step of radiating a laser beam to the laser machining target region to heat the machining target after the first step ends.

* * * * *